US012398035B2

(12) United States Patent
Mortensen (10) Patent No.: US 12,398,035 B2
(45) Date of Patent: Aug. 26, 2025

(54) SYNTHESIS GAS PRODUCTION BY STEAM METHANE REFORMING (71) Applicant: HALDOR TOPSØE A/S, Kgs. Lyngby (DK)

(72) Inventor: Peter Mølgaard Mortensen, Roskilde (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 878 days.

(21) Appl. No.: 17/421,422

(22) PCT Filed: Feb. 27, 2020

(86) PCT No.: PCT/EP2020/055174
§ 371 (c)(1),
(2) Date: Jul. 8, 2021

(87) PCT Pub. No.: WO2020/174057
PCT Pub. Date: Sep. 3, 2020

(65) Prior Publication Data
US 2022/0119255 A1 Apr. 21, 2022

(30) Foreign Application Priority Data
Feb. 28, 2019 (DK) .................................. 2019 00255

(51) Int. Cl.
B01J 8/06 (2006.01)
C01B 3/34 (2006.01)
(Continued)

(52) U.S. Cl.
CPC .............. C01B 3/382 (2013.01); B01J 8/067 (2013.01); C01B 3/342 (2013.01); C01B 3/384 (2013.01);
(Continued)

(58) Field of Classification Search
CPC .......... C01B 3/382; C01B 3/342; C01B 3/384; C01B 3/48; C01B 2203/0233;
(Continued)

(56) References Cited

U.S. PATENT DOCUMENTS 3,147,080 A 9/1964 Jahnig
3,441,393 A 4/1969 Finneran
(Continued)

FOREIGN PATENT DOCUMENTS

CN 1390777 A 1/2003
DE 19841993 A1 3/2000
(Continued)

OTHER PUBLICATIONS

Office Action (Communication pursuant to Article 94(3) EPC) issued Mar. 13, 2023, by the European Patent Office in corresponding European Patent Application No. 20 707 428.7-1108. (6 pages).
(Continued)

Primary Examiner — Huy Tram Nguyen
(74) Attorney, Agent, or Firm — Boone IP Law (57) ABSTRACT A synthesis gas plant for producing a synthesis gas, where the synthesis gas plant includes a reforming section arranged to receive said feed gas and provide a combined synthesis gas, wherein said reforming section includes an electrically heated reforming reactor, a fired reforming reactor and an optional third reforming reactor. The reforming section is arranged to output a combined synthesis gas. An optional post processing unit downstream the reforming section is arranged to receive said combined synthesis gas stream and provide a post processed synthesis gas stream. A gas separation unit arranged to separate the combined synthesis gas stream or the post processed synthesis gas stream into a condensate, a product synthesis gas and an off-gas. At least a part of the off-gas is recycled from said gas separation unit
(Continued)

to said one or more burners. Also, a process for producing synthesis gas from a feed gas comprising hydrocarbons.

18 Claims, 4 Drawing Sheets

(51) Int. Cl.
*C01B 3/38* (2006.01)
*C01B 3/48* (2006.01)

(52) U.S. Cl.
CPC ........ *C01B 3/48* (2013.01); *C01B 2203/0233* (2013.01); *C01B 2203/0238* (2013.01); *C01B 2203/0244* (2013.01); *C01B 2203/0283* (2013.01); *C01B 2203/0475* (2013.01); *C01B 2203/0495* (2013.01); *C01B 2203/0816* (2013.01); *C01B 2203/0827* (2013.01); *C01B 2203/085* (2013.01); *C01B 2203/0866* (2013.01); *C01B 2203/141* (2013.01); *C01B 2203/142* (2013.01); *C01B 2203/146* (2013.01)

(58) Field of Classification Search
CPC .... C01B 2203/0238; C01B 2203/0244; C01B 2203/0283; C01B 2203/0475; C01B 2203/0495; C01B 2203/0816; C01B 2203/0827; C01B 2203/085; C01B 2203/0866; C01B 2203/141; C01B 2203/142; C01B 2203/146; B01J 8/067
USPC ........................................................ 422/600
See application file for complete search history.

(56) References Cited

U.S. PATENT DOCUMENTS

| | | | |
|---|---|---|---|
| 3,450,507 A | 6/1969 | Korwin | |
| 4,079,017 A | 3/1978 | Crawford et al. | |
| 5,019,356 A | 5/1991 | Silberring | |
| 6,100,303 A | 8/2000 | Hirotani | |
| 6,103,143 A | 8/2000 | Sircar et al. | |
| 6,390,030 B1 | 5/2002 | Isogawa et al. | |
| 7,691,182 B1* | 4/2010 | Muradov | C10L 3/08 422/177 |
| 9,212,319 B2* | 12/2015 | Kresnyak | C10G 2/30 |
| 2001/0018039 A1 | 8/2001 | Gam | |
| 2002/0103264 A1 | 8/2002 | Allam | |
| 2002/0119084 A1 | 8/2002 | Boneberg et al. | |
| 2003/0014974 A1 | 1/2003 | Rojey | |
| 2005/0171217 A1 | 8/2005 | Bowe et al. | |
| 2006/0014056 A1 | 1/2006 | Park | |
| 2007/0010590 A1 | 1/2007 | Abbott et al. | |
| 2007/0264186 A1 | 11/2007 | Dybkjaer et al. | |
| 2010/0150810 A1 | 6/2010 | Yoshida et al. | |
| 2011/0042620 A1 | 2/2011 | Singh | |
| 2014/0234168 A1 | 8/2014 | Bowe et al. | |
| 2015/0129805 A1 | 5/2015 | Karpenko et al. | |
| 2015/0137044 A1 | 5/2015 | Finnerty | |
| 2015/0175416 A1 | 6/2015 | Jensen et al. | |
| 2016/0115017 A1 | 4/2016 | Ostuni et al. | |
| 2016/0289071 A1 | 10/2016 | Mabrouk et al. | |
| 2017/0183228 A1* | 6/2017 | Lin | B01J 19/2415 |
| 2018/0148330 A1 | 5/2018 | Tamhankar | |
| 2022/0081291 A1 | 3/2022 | Mortensen | |
| 2022/0162067 A1 | 5/2022 | Mortensen et al. | |

FOREIGN PATENT DOCUMENTS

| | | | | |
|---|---|---|---|---|
| EP | 0522744 A2 | 1/1993 | | |
| EP | 2142467 A1 | 1/2010 | | |
| EP | 2181755 A2 * | 5/2010 | ......... | B01D 46/2459 |
| EP | 3018095 A1 | 12/2017 | | |
| EP | 3574991 A1 * | 12/2019 | ............ | B01J 15/005 |
| GB | 2168718 A | 6/1986 | | |
| GB | 2439653 B | 8/2008 | | |
| GB | 2448089 A | 10/2008 | | |
| GB | 2545474 A | 6/2017 | | |
| KR | 20120131822 A | 12/2012 | | |
| WO | 02/02220 A1 | 1/2002 | | |
| WO | 2006027175 A1 | 3/2006 | | |
| WO | WO-2008122399 A1 * | 10/2008 | ............ | C01B 3/382 |
| WO | 2010020358 A2 | 2/2010 | | |
| WO | 2013013895 A1 | 1/2013 | | |
| WO | 2014180888 A1 | 11/2014 | | |
| WO | WO-2015198186 A1 * | 12/2015 | ............ | B01J 8/0221 |
| WO | 2017215789 A1 | 12/2017 | | |
| WO | 2020/174056 A1 | 9/2020 | | |
| WO | 2020/174057 A1 | 9/2020 | | |
| WO | 2020/174059 A1 | 9/2020 | | |

OTHER PUBLICATIONS

First Office Action with English translation malled on Aug. 31, 2023, by the China National Intellectual Property Administration for Chinese Application No. (2023083100051020), 15 pages.
Danish Search Report issued in corresponding Danish Patent Application No. PA 2019 00255 dated Sep. 12, 2019. (9 pages).
Danish Search Report issued in corresponding Danish Patent Application No. PA 2019 00256 dated Sep. 12, 2019. (9 pages).
Danish Search Report issued in corresponding Danish Patent Application No. PA 2019 00258 dated Oct. 25, 2019. (9 pages).
International Search Report (PCT/ISA/210) and Written Opinion (PCT/ISA/237) mailed on Jun. 4, 2020, by the European Patent Office as the International Searching Authority for International Application No. PCT/EP2020/055173. (12 pages).
International Search Report (PCT/ISA/210) and Written Opinion (PCT/ISA/237) mailed on Jun. 4, 2020, by the European Patent Office as the International Searching Authority for International Application No. PCT/EP2020/055174. (10 pages).
International Search Report (PCT/ISA/210) and Written Opinion (PCT/ISA/237) mailed on Jun. 4, 2020, by the European Patent Office as the International Searching Authority for International Application No. PCT/EP2020/055178. (11 pages).

* cited by examiner

SYNTHESIS GAS PRODUCTION BY STEAM METHANE REFORMING

FIELD OF THE INVENTION

The present invention relates to a synthesis gas plant and a process for producing synthesis gas by steam methane reforming of feed gasses comprising hydrocarbons. The invention relates particularly to a synthesis gas plant and a process for producing hydrogen, where steam methane reforming takes place in two parallel reforming reactors.

BACKGROUND

Fired reforming reactors for steam methane reforming, such as a fired steam methane reformer or a fired convective reformer, typically use large amounts of fuel to supply heat for the steam methane reforming reaction. In the case of a fired steam methane reformer (SMR), fuel is imported directly to a fired side of the SMR and burned to provide radiant heat for tubes of the SMR, whilst excess heat in the flue gas of the fired side of the SMR is typically utilized in a waste heat section of the SMR. In the case of a convective reformer or convective reforming reactor, fuel is led to a burner which generates a flow of a hot flue gas. An enclosure forms a convective channel or convection chamber that allows flue gas from the burner to flow over tubes of the convective reformer housing catalyst.

The steam reforming reaction is highly endothermic. High temperatures typically in excess of 800-850° C. are needed to reach acceptable conversions of the methane in the feed. A typical SMR consists of a number of tubes filled with catalyst pellets placed inside a furnace. The tubes are typically 10-13 meters long and will typically have an inner diameter between 80 and 160 mm. Burners placed in the furnace provide the required heat for the reactions by combustion of a fuel gas. A maximum average heat flux of 80000-90000 kcal/h/m$^2$ of inner tube surface is not uncommon. There is a general limitation to the obtainable heat flux due to mechanical constraints and the capacity is therefore increased by increasing the number of tubes and the furnace size. More details on the SMR type reforming reactor can be found in the art, e.g. "Synthesis gas production for FT synthesis"; Chapter 4, p. 258-352, 2004. As used herein, the abbreviation "SMR" is meant to denote an externally fired tubular steam methane reformer as described above.

The fuel for these fired processes is typically a mix of off-gas(ses) from the process downstream the reformer(s) and import of natural gas or other suitable hydrocarbons.

It is an object of the invention to provide an alternative configuration of a synthesis gas plant for production of synthesis gas.

It is also an object of the invention to provide a system and process for producing synthesis gas by steam reforming wherein the overall energy consumption is reduced compared to a system with a single fired reforming reactor, such as a tubular steam methane reformer or a convective reformer.

It is also an object of the invention to provide a plant and process wherein the capacity of an existing reforming section may be increased. Here, the term "reforming section" is meant to denote the section of a plant wherein reforming of hydrocarbons take place, that is a section comprising one or more reforming reactors.

It is furthermore an object of the invention to provide a synthesis gas plant and process wherein the overall emission of carbon dioxide and other emissions detrimental to the climate, such as NOx or SOx, are reduced considerably by minimizing the amount of hydrocarbons used for providing heat for the reforming reactions.

SUMMARY OF THE INVENTION

In the following, reference is made to embodiments of the invention. However, it should be understood that the invention is not limited to specific described embodiments. Instead, any combination of the following features and elements, whether related to different embodiments or not, is contemplated to implement and practice the invention.

An aspect of the invention relates to a synthesis gas plant for producing a synthesis gas, said synthesis gas plant comprising:

a reforming section arranged to receive a feed gas and provide a combined synthesis gas, wherein said reforming section comprises:
  an electrically heated reforming reactor housing a first catalyst, said electrically heated reforming reactor being arranged for receiving a first part of said feed gas comprising hydrocarbons and generating a first synthesis gas stream,
  a fired reforming reactor in parallel with said electrically heated reforming reactor, said fired reforming reactor comprising one or more tubes housing a second catalyst, said fired reforming reactor further comprising one or more burners for providing heat to said one or more tubes, said one or more tubes being arranged for receiving a second part of said feed gas comprising hydrocarbons and outputting a second synthesis gas stream, wherein said reforming section is arranged to output a combined synthesis gas stream comprising said first and/or second synthesis gas streams or part thereof, an optional post processing unit downstream the reforming section, where the optional post processing unit is arranged to receive the combined synthesis gas stream and provide a post processed synthesis gas stream, a gas separation unit arranged to separate said combined synthesis gas stream or said post processed synthesis gas stream into at least a condensate, a product synthesis gas and an off-gas, and means for recycling at least part of the said off-gas from said gas separation unit to said one or more burners.

The synthesis gas plant of the invention provides a concept where synergy is obtained between an electrically heated reforming reactor and the operation of a fired reforming reactor. By placing an electrically heated reforming reactor in parallel to another reforming reactor, the two reforming reactors can collectively use the same preheating and pre-conditioning system and also the same product gas separation. Moreover, by letting a part of the reforming reaction take place within an electrically heated reforming reactor, the import of fuel to the fired reforming reactor can be reduced/minimized. Moreover, by recycling off-gas from the gas separation unit back to the one or more burners of the fired reforming reactor, it is rendered possible to maximize the use of hydrocarbons in the feed gas on the process side and to minimize the direct use of such hydrocarbons on the firing side of the fired reforming reactor. Thus, the overall consumption of hydrocarbons is minimized for a given output of combined synthesis gas from the reforming section.

It is possible to balance the synthesis gas plant so that the operation of the one or more burners is adjusted to being primarily, or even fully, driven by heat supplied by burning a recycled off-gas. The typical fired reforming reactor is operated using a fuel feedstock for the burners, which is typically composed in part of recycled off-gas and in part of a dedicated fuel feedstock, such as natural gas. The resulting heating from the recycled off-gas and the dedicated fuel feedstock determines the outlet temperature, and consequently methane conversion, of the synthesis gas produced in the fired reforming reactor. As an example, the burners are driven by about 90 vol % recycled off-gas and about 10 vol % natural gas. Flow control of the fuel from the dedicated hydrocarbon feedstock allows for active burner control because this flow can be increased or decreased to control the desired temperature. Alternatively, the temperature control of the fired section can be done by using only a partial amount of the recycle gas, where temperature control is achieved by regulating the proportion of off-gas being used as fuel feedstock, which then means that some of the off-gas needs to be vented or used elsewhere.

In the plant of the present invention, the use of an electrically heated reforming reactor in parallel with a fired reforming reactor allows for controlling the temperature in the fired reforming reactor through the electrically heated reforming reactor, where the fired reforming reactor is operated on the full amount of the recycled off-gas, potentially with some additional fuel gas such as natural gas. The outlet temperature of the fired reforming reactor is then controlled by adjusting the split between process gas going to the electrically heated reforming reactor relative to the fired reformer, where an increased outlet temperature of the fired reforming reactor is achieved by decreasing the flow to the fired reforming reactor and increasing the flow to the electrically heated reforming reactor, and vice versa. The electrically heated reforming reactor will then balance the synthesis gas product from this unit, by increasing or decreasing the electrical power input to give a constant product output, utilizing the fact that electricity control is much faster to do than gas flow control. This allows for a minimum use of natural gas imported for being burned in the synthesis gas plant for heat, which in turn allows for an optimal utilization of feed gasses comprising hydrocarbons to the synthesis gas plant. This can still be combined with the use of a relatively small amount of make-up gas comprising hydrocarbons also being fed to the one or more burners of the fired reforming reactor in order to allow control of the duty of the burners and accurate temperature control.

It should be noted that the fired reforming reactor and the electrically heated reforming reactor in parallel will generate a larger amount of off-gas compared to operating the SMR alone at the same capacity. Since the electrically heated reforming reactor is heated without use of a fuel gas, no off-gas is recycled to the electrically heated reforming reactor. Hence, all the off-gas can be recycled to the burners in the fired reforming reactor. This means that the import of additional fuel to the fired reforming reactor, for example in the form of natural gas, can be reduced or eliminated. This creates an advantage of the design of the plant of the invention over a reforming section having a standalone electrically heated reforming, where the off-gas does not have a natural use, and instead ends up as an unwanted byproduct of the process.

Moreover, by letting a part of the reforming reaction take place within an electrically heated reforming reactor, the import of fuel to the fired reforming reactor can be reduced/minimized.

It should be noted, that the condensate from the gas separation unit typically primarily is water, but that it can also contain traces of dissolved gasses, such as $CO_2$, $H_2$, etc.

It should also be noted that the gas separation unit potentially also provides a byproduct, stream, such as a stream comprising $CO_2$ from a $CO_2$ removal operation.

The term "fired reforming reactor" is meant to denote a reforming reactor wherein a fuel is burned off in order to supply heat for the steam methane reforming reaction. It should also be noted that the term "reforming reactor" is meant to cover any appropriate reactor in which steam methane reforming takes place. Thus, "reforming reactor" covers a fired steam methane reforming reactor, a convective reforming reactor, an electrically heated steam methane reforming reactor, an autothermal reforming reactor, a gas heated steam methane reforming reactor, a bayonet reforming reactor, a.o.

Since the electrically heated reforming reactor is electrically heated, less overall energy consumption takes place compared to a fired steam methane reforming reactor, since a high temperature flue gas of the reforming reactor is avoided. Moreover, if the electricity utilized for heating the electrically heated reforming reactor and possibly other units of the synthesis gas plant is provided from renewable energy resources, the overall consumption of hydrocarbons for the synthesis gas plant is minimized and $CO_2$ emissions accordingly reduced.

Typically, the combined synthesis gas stream from the reforming section contains the first and second synthesis gas streams. Hereby, the further processing of the combined synthesis gas from the reforming section is carried out on all the first and second synthesis gas streams in combination. However, it is conceivable that the combined synthesis gas stream only contains a part of the first and/or the second synthesis gas stream and that the remaining part of the first and/or second synthesis gas stream is led to other equipment downstream the reforming section. This could e.g. be the case where the synthesis gas plant is arranged to provide one product stream in the form of a hydrogen stream and another product stream in the form of a CO rich synthesis gas stream.

In this context, the term "feed gas comprising hydrocarbons" is meant to denote a gas with one or more hydrocarbons and possibly other constituents. Thus, typically feed gas comprising hydrocarbons comprises a hydrocarbon gas, such as $CH_4$ and optionally also higher hydrocarbons often in relatively small amounts, in addition to small amounts of other gasses. Higher hydrocarbons are components with two or more carbon atoms such as ethane and propane. Examples of "hydrocarbon gas" may be natural gas, town gas, naphtha or a mixture of methane and higher hydrocarbons, biogas or LPG. Hydrocarbons may also be components with other atoms than carbon and hydrogen such as oxygenates. The term "feed gas comprising hydrocarbons" is meant to denote a feed gas comprising a hydrocarbon gas with one or more hydrocarbons mixed with steam, hydrogen and possibly other constituents, such as carbon monoxide, carbon dioxide, nitrogen and argon. Typically, the feed gas(ses) let into the reforming section has (have) a predetermined ratio of hydrocarbon gas, steam and hydrogen, and potentially also carbon dioxide.

Moreover, the term "steam reforming" or "steam methane reforming reaction" is meant to denote a reforming reaction according to one or more of the following reactions:

$$CH_4 + H_2O \leftrightarrow CO + 3H_2 \qquad (i)$$

$$CH_4 + 2H_2O \leftrightarrow CO_2 + 4H_2 \qquad (ii)$$

$$CH_4 + CO_2 \leftrightarrow 2CO + 2H_2 \qquad (iii)$$

Reactions (i) and (ii) are steam methane reforming reactions, whilst reaction (iii) is the dry methane reforming reaction.

For higher hydrocarbons, viz. $C_nH_m$, where n≥2, m≥4, equation (i) is generalized as:

$$C_nH_m + nH_2O \leftrightarrow nCO + (n+m/2)H_2 \quad \text{(iv) where n≥2, m≥4.}$$

Typically, steam reforming is accompanied by the water gas shift reaction (v):

$$CO + H_2O \leftrightarrow CO_2 + H_2 \quad \text{(v)}$$

The terms "steam methane reforming" and "steam methane reforming reaction" is meant to cover the reactions (i) and (ii), the term "steam reforming" is meant to cover the reactions (i), (ii) and (iv), whilst the term "methanation" covers the reverse reaction of reaction (i). In most cases, all of these reactions (i)-(v) are at, or close to, equilibrium at the outlet from the reforming reactor. The term "prereforming" is often used to cover the catalytic conversion of higher hydrocarbons according to reaction (iv). Prereforming is typically accompanied by steam reforming of methane and/or methanation (depending upon the gas composition and operating conditions) and the water gas shift reaction. Prereforming is often carried out in adiabatic reactors but may also take place in heated reactors.

The term "synthesis gas" is meant to denote a gas comprising hydrogen, carbon monoxide and also carbon dioxide and small amounts of other gasses, such as argon, nitrogen, methane, etc.

Typically, the feed gas will have undergone desulfurization to remove sulfur therein prior to being inlet into the reforming section in order to avoid deactivation of the catalysts in the reforming reactors of the reforming section.

In an embodiment, the synthesis gas plant further comprises a gas purification unit and/or a prereforming unit upstream the reforming section. The gas purification unit is e.g. a desulfurization unit, such as a hydrodesulfurization unit.

In the prereformer, the hydrocarbon gas will, together with steam, and potentially also hydrogen and/or other components such as carbon dioxide, undergo prereforming according to reaction (iv) in a temperature range of ca. 350-550° C. to convert higher hydrocarbons as an initial step in the process, normally taking place downstream the desulfurization step. This removes the risk of carbon formation from higher hydrocarbons on catalyst in the subsequent process steps. Optionally, carbon dioxide or other components may also be mixed with the gas leaving the prereforming step to form the feed gas.

The gas separation unit comprises one or more of the following units: a flash separation unit, a $CO_2$ removal unit, a pressure swing adsorption unit (PSA unit), a membrane, and/or a cryogenic separation unit. By flash separation is meant a phase separation unit, where a stream is divided into a liquid and gas phase close to or at the thermodynamic phase equilibrium at a given temperature. By $CO_2$ removal is meant a unit utilizing a process, such as chemical absorption, for removing $CO_2$ from the process gas. In chemical absorption, the $CO_2$ containing gas is passed over a solvent which reacts with $CO_2$ and in this way binds it. The majority of the chemical solvents are amines, classified as primary amines as monoethanolamine (MEA) and digylcolamine (DGA), secondary amines as diethanolamine (DEA) and diisopropanolamine (DIPA), or tertiary amines as triethanolamine (TEA) and methyldiethanolamine (MDEA), but also ammonia and liquid alkali carbonates as $K_2CO_3$ and $NaCO_3$ can be used. By swing adsorption, a unit for adsorbing selected compounds is meant. In this type of equipment, a dynamic equilibrium between adsorption and desorption of gas molecules over an adsorption material is established. The adsorption of the gas molecules can be caused by steric, kinetic, or equilibrium effects. The exact mechanism will be determined by the used adsorbent and the equilibrium saturation will be dependent on temperature and pressure. Typically, the adsorbent material is treated in the mixed gas until near saturation of the heaviest compounds and will subsequently need regeneration. The regeneration can be done by changing pressure or temperature. In practice, this means that a process with at least two units is used, saturating the adsorbent at high pressure or low temperature initially in one unit, and then switching unit, now desorbing the adsorbed molecules from the same unit by decreasing the pressure or increasing the temperature. When the unit operates with changing pressures, it is called a pressure swing adsorption unit, and when the unit operates with changing temperature, it is called a temperature swing adsorption unit. Pressure swing adsorption can generate a hydrogen purity of 99.9% or above. By membrane is meant separation over an at least partly solid barrier, such as a polymer, where the transport of individual gas species takes place at different rates defined by their permeability. This allows for up-concentration, or dilution, of a component in the retentate of the membrane. By cryogenic separation is meant a process utilizing the phase change of different species in the gas to separate individual components from a gas mixture by controlling the temperature, typically taking place below −150° C.

In a specific embodiment, the gas separation unit comprises a flash separation unit in series with a pressure swing adsorption unit. A condensate comprising mostly water is thereby firstly separated in the flash separation unit, and then a hydrogen product is purified in the pressure swing adsorption unit. The pressure swing adsorption unit will in this embodiment also produce an off-gas comprising $CO_2$, CO, $CH_4$, and $H_2$.

In another specific embodiment, the gas separation unit have a flash separation unit in series with a carbon removal unit, in series with a CO cold box. A condensate comprising mostly water is thereby firstly separated in the flash separation unit, and then $CO_2$ is removed in the $CO_2$ removal unit. Finally, the product gas is separated into a product gas of substantially pure CO, a product gas of substantially pure $H_2$, and an off-gas. The off-gas will in this case comprise CO, $CH_4$, and $H_2$.

By the configuration of the synthesis gas plant, maximum utilization of all streams is achieved by returning the fuel rich off-gases generated from different embodiments of gas separation units to said one or more burners.

In a particular embodiment of the plant of the invention, the plant comprises control means for adjusting the ratio of the first part of the feed gas to the second part of the feed gas so as to produce a selected outlet temperature in the second synthesis gas stream and a selected amount of off-gas from the gas separation unit. Preferably, the plant further comprises control means for adjusting the heating of the electrically heated reforming reactor to produce a constant output of the first synthesis gas stream.

In an embodiment, the electrically heated reforming reactor of the synthesis gas plant comprises:
a pressure shell housing an electrical heating unit arranged to heat the first catalyst, where the first catalyst comprises a catalytically active material operable to catalyzing steam reforming of the first part of the feed gas, wherein the pressure shell has a design pressure of between 5 and 50 bar, a heat insulation layer adjacent to at least part of the inside of the pressure shell, and at least two conductors electrically connected to the electrical heating unit and to an electrical power supply placed outside the pressure shell, wherein the electrical power supply is dimensioned to heat at least part of the first catalyst to a temperature of at least 500° C. by passing an electrical current through the electrical heating unit.

An important feature of the electrically heated reforming reactor is that the energy is supplied inside the reforming reactor, instead of being supplied from an external heat source via heat conduction, convection and radiation, e.g. through catalyst tubes. In an electrically heated reforming reactor with an electrical heating unit connected to an electrical power supply via conductors, the heat for the reforming reaction is provided by resistance heating. The hottest part of the electrically heated reforming reactor will be within the pressure shell of the electrically heated reforming reactor. Preferably, the electrical power supply and the electrical heating unit within the pressure shell are dimensioned so that at least part of the electrical heating unit reaches a temperature of 850° C., preferably 900° C., more preferably 1000° C. or even more preferably 1100° C.

The synthesis gas plant of the invention may advantageously comprise one or more compressors and/or pumps upstream the reforming section. The compressors/pumps are arranged to compress the feed to a pressure of between 5 and 45 bar. The constituents of the feed, viz. water/steam, hydrogen and hydrocarbon feed, may be compressed individually and fed individually into the reforming section or to the reforming reactors thereof.

The first catalyst may be a bed of catalyst particles, e.g. pellets, typically in the form of catalytically active material supported on a high area support with electrically conductive structures embedded in the bed of catalyst particles. Alternatively, the catalyst may be catalytically active material supported on a macroscopic structure, such as a monolith.

When the electrically heated reforming reactor comprises a heat insulation layer adjacent to at least part of the inside of the pressure shell, appropriate heat and electrical insulation between the electrical heating unit and the pressure shell is obtained. Typically, the heat insulation layer will be present at the majority of the inside of the pressure shell to provide thermal insulation between the pressure shell and the electrical heating unit/first catalyst; however, passages in the heat insulation layers are needed in order to provide for connection of conductors between the electrical heating unit and the electrical power supply and to provide for inlets/outlets for gasses into/out of the electrically heated reforming reactor.

The presence of heat insulating layer between the pressure shell and the electrical heating unit assists in avoiding excessive heating of the pressure shell, and assists in reducing thermal losses to the surroundings of the electrically heated reforming reactor. The temperatures of the electrical heating unit may reach up to about 1300° C., at least at some parts thereof, but by using the heat insulation layer between the electrical heating unit and the pressure shell, the temperature of the pressure shell can be kept at significantly lower temperatures of e.g. 500° C. or even 200° C. This is advantageous since typical construction steel materials are unsuitable for pressure bearing applications at high temperatures, such as above 1000° C. Moreover, a heat insulating layer between the pressure shell and the electrical heating unit assists in control of the electrical current within the reforming reactor, since heat insulation layer is also electrically insulating. The heat insulation layer could be one or more layers of solid material, such as ceramics, inert material, refractory material or a gas barrier or a combination thereof. Thus, it is also conceivable that a purge gas or a confined gas constitutes or forms part of the heat insulation layer.

As the hottest part of the electrically heated reforming reactor during operation is the electrical heating unit, which will be surrounded by heat insulation layer, the temperature of the pressure shell can be kept significantly lower than the maximum process temperature. This allows for having a relative low design temperature of the pressure shell of e.g. 700° C. or 500° C. or preferably 300° C. or 200° C. of the pressure shell whilst having maximum process temperatures of 800° C. or 900° C. or even 1100° C. or even up to 1300° C.

Another advantage is that the lower design temperature compared to a fired SMR means that in some cases the thickness of the pressure shell can be decreased, thereby saving costs.

It should be noted that the term "heat insulating material" is meant to denote materials having a thermal conductivity of about 10 W·m$^{-1}$·K$^{-1}$ or below. Examples of heat insulating materials are ceramics, refractory material, alumina-based materials, zirconia-based materials and similar.

In an embodiment, the synthesis gas plant further comprises a control system arranged to control the electrical power supply to ensure that the temperature of the gas exiting the electrically heated reforming reactor lies in a predetermined range and/or to ensure that the conversion of hydrocarbons in the first part of the feed gas lies in a predetermined range and/or to ensure the dry mole concentration of methane lies in a predetermined range and/or to ensure the approach to equilibrium of the steam reforming reaction lies in a predetermined range. Typically, the maximum temperature of the gas lies between 500° C. and 1000° C., such as between 850° C. and 1000° C., such as at about 950° C., but even higher temperatures are conceivable, e.g. up to 1300° C. However, the maximum temperature of the gas exiting the electrically heated reforming reactor may be as low as 500° C., for instance in a case where the electrically heated reforming reactor is of the bayonet type. A bayonet tube reforming reactor has of an inner tube coaxially arranged in an outer sheath tube and the first catalyst is positioned in the annular space between the outer sheath tube and the inner tube. The maximum temperature of the gas will be achieved close to the most downstream part of the first catalyst as seen in the flow direction of the feed gas.

The control of the electrical power supply is the control of the electrical output from the power supply. The control of the electrical power supply may e.g. be carried out as a control of the voltage and/or current from the electrical power supply, as a control of whether the electrical power supply is turned on or off or as a combination hereof. The power supplied to the electrically heated reforming reactor can be in the form of alternating current or direct current.

In an embodiment, the reforming section of the gas plant furthermore comprises an autothermal reforming reactor downstream the electrically heated reforming reactor and the fired reforming reactor. The autothermal reforming reactor comprises a third catalyst and is arranged to receive the first and/or second synthesis gas or part thereof and to provide an auto-reformed synthesis gas stream, wherein the auto-reformed synthesis gas is output from the reforming section as at least part of the combined gas stream. In addition to the first and/or second synthesis gas or parts thereof input into the autothermal reforming reactor, a stream of oxidant gas is inlet. The stream of oxidant gas comprises oxygen and may be e.g. air or oxygen, or a mixture of more than 90% oxygen with the balance being e.g nitrogen, steam, and/or argon. In one embodiment and since the temperature of the first synthesis gas leaving the electrically heated reforming reactor may be relatively high, such as 900° C. to 1050° C., the first synthesis gas may bypass the autothermal reforming reactor, so that only the second synthesis gas from the fired reforming reactor is input to the autothermal reforming reactor. In this case, the first synthesis gas and the auto-reformed synthesis gas are combined to the combined synthesis gas output from the reforming section. Alternatively, the second synthesis gas might bypass the autothermal reforming reactor. The addition of an autothermal reforming reactor to the reforming section of the synthesis gas plant allows for an increased overall output of the synthesis gas plant compared to a synthesis gas plant with an electrically heated reforming reactor and a fired reforming reactor.

In an embodiment, the reforming section of the synthesis gas plant furthermore comprises a gas heated steam methane reforming reactor downstream the electrically heated reforming reactor and the fired reforming reactor. The gas heated steam methane reforming reactor comprises a fourth catalyst and being operable to receive a third part of the feed gas comprising hydrocarbons and to utilize at least part of the first and/or second synthesis gas streams as heating media in heat exchange within the gas heated steam methane reforming reactor. The gas heated steam methane reforming reactor is arranged for generating a third synthesis gas stream over the fourth catalyst and for outputting the third synthesis gas stream from the reforming section as at least part of the combined synthesis gas. The overall heat efficiency of the synthesis gas plant is increased by the addition of the gas heated steam methane reforming reactor, since the sensitive heat of the first and second synthesis gas streams is used within the gas heated steam methane reforming reactor. Moreover, when the synthesis gas plant includes a gas heated steam methane reforming reactor, the overall output of the synthesis gas plant is increased compared to a synthesis gas plant without the additional gas heated steam methane reforming reactor.

In an embodiment, the reforming section of the synthesis gas plant furthermore comprises a gas heated steam methane reforming reactor in parallel to the electrically heated reforming reactor and the fired reforming reactor. The gas heated steam methane reforming reactor comprises a fourth catalyst and is operable to receive a third part of the feed gas comprising hydrocarbons and to utilize at least part of the auto-reformed synthesis gas stream as heating medium in heat exchange within the gas heated steam methane reforming reactor. The gas heated steam methane reforming reactor is arranged for generating a third synthesis gas stream and for outputting the third synthesis gas stream from the reforming section as at least part of the combined synthesis gas. In this embodiment, the synthesis gas plant comprises a fired reforming reactor in parallel with an electrically heated reforming reactor upstream an autothermal reforming reactor, in parallel to a gas heated steam methane reforming reactor. Since the temperature of the first synthesis gas leaving the electrically heated reforming reactor may be relatively high, such as 900° C. to 1050° C., the first synthesis gas may bypass the autothermal reactor. Thus, the first synthesis gas may be led directly to the gas heated steam methane reforming reactor, whilst the second synthesis gas is input to the autothermal reforming reactor. The mixture of the first synthesis gas, the second synthesis gas and the auto-reformed synthesis gas is input to the gas heated steam methane reforming reactor. This mixture supplies the heat for steam reforming of the third part of the feed gas comprising hydrocarbons. In one configuration, the mixture of the first synthesis gas, the second synthesis gas and the auto-reformed synthesis gas is mixed with the third synthesis gas within the gas heated reforming reactor, after reforming of the third part of the feed gas within the gas heated reforming reactor. The gas output from the gas heated steam methane reforming reactor is thus the combined synthesis gas. Alternatively, the second synthesis gas is input to the autothermal reforming reactor and the auto-reformed synthesis gas is input as heating medium to the gas heated steam methane reforming reactor, which generates and outputs the third synthesis gas. The first synthesis gas may bypass both the autothermal reforming reactor and the gas heated reactor and be combined with the third synthesis gas to form the combined synthesis gas stream, downstream the gas heated steam methane reforming reactor. When the synthesis gas plant includes four reforming reactors, the overall output of the synthesis gas plant is increased.

A gas heated steam methane reforming reactor is configured to use a hot gas to supply the heat for the endothermic steam methane reforming reactions by heat exchange, typically over a tube wall. An example of a configuration of a heat exchange reformer has several parallel tubes filled with catalyst which receive the feed gas. In the bottom of the reactor, the product gas from the catalyst filled tubes is mixed with hot synthesis gas from the upstream reforming units and the combined synthesis gas carries out heat exchange with the catalyst filled tubes. Other configurations of heat exchange reforming are also conceivable.

In an embodiment, the post processing unit is a post conversion unit having an inlet for allowing inletting heated $CO_2$ to the combined synthesis gas upstream the post conversion unit and housing a fifth catalyst active for catalyzing steam methane reforming, methanation and reverse water gas shift reactions. The post conversion unit is e.g. an adiabatic post conversion unit or a gas heated heat exchange reactor. The post processed synthesis gas stream is a synthesis gas stream with an $H_2/CO$ ratio lower than the $H_2/CO$ ratio of the combined synthesis gas. By adding heated $CO_2$ and carrying out steam methane reforming/methanation and reverse water gas shift reactions in a separate reactor downstream the reforming section, the CO production of the process may be increased and/or the $H_2/CO$ ratio may be tailored. The $H_2/CO$ ratio of the post processed synthesis gas stream is e.g. lower than 1.8, lower than 1.5 or even lower than 1.0. The temperature of the heated $CO_2$ added may be e.g. a temperature of about 300° C., 400° C. or even of about 500° C. or above.

In an embodiment, the post processing unit is a water gas shift unit arranged to carry out water gas shift reaction (Reaction (v) above). In this embodiment, the post processed synthesis gas is a water gas shifted synthesis gas stream, such as a hydrogen rich synthesis gas or a hydrogen gas stream. The water gas shift unit may be a single water gas shift unit, such as a medium temperature water gas shift unit, or a combination of two or more water gas shift units, e.g. a high temperature water gas shift unit and a low temperature water gas shift unit.

In an embodiment, the fired reforming reactor is a steam methane reforming reactor. The steam methane reforming reactor is e.g. a side fired, top fired, bottom fired or terrace fired SMR.

In an embodiment, the fired reforming reactor is a convective reforming reactor, wherein flue gas from the one or more burners is used as heat exchange medium with the convective reforming reactor.

The tubes of the convective reforming reactor may be in a configuration, where tubes housing the second catalyst are enclosed within enclosures. The tubes housing the second catalyst convectively receives sensible heat from the flue gas on the outside of the tubes. The one or more burner(s) generate(s) a flow of a flue gas having a sensible heat. The enclosures form a convective channel or convection chamber that allows flue gas to exit the burners and flow over the tubes housing the second catalyst. The outside surface of the tubes housing the second catalyst is preferably finned or studded to increase its exposed surface area to the flue gas. As used herein, the term flue gas from the burner section typically has a temperature above 700° C., such as between 700° C. and 1200° C.

In an embodiment, the electrical heating unit comprises a macroscopic structure of electrically conductive material, where the macroscopic structure supports a ceramic coating and the ceramic coating supports a catalytically active material. Thus, during operating of the synthesis gas plant, an electrical current is passed through the macroscopic structure and thereby heats the macroscopic structure and the catalytically active material supported thereon. The close proximity between the catalytically active material and the macroscopic structure enables efficient heating of the catalytically active material by solid material heat conduction from the resistance heated macroscopic structure. The amount and composition of the catalytically active material can be tailored to the steam reforming reaction at the given operating conditions. The surface area of the macroscopic structure, the fraction of the macroscopic structure coated with a ceramic coating, the type and structure of the ceramic coating, and the amount and composition of the catalytically active material may be tailored to the steam reforming reaction at the given operating conditions.

The term "electrically conductive" is meant to denote materials with an electrical resistivity in the range from: $10^{-4}$ to $10^{-8}$ Ω·m at 20° C. Thus, materials that are electrically conductive are e.g. metals like copper, silver, aluminum, chromium, iron, nickel, or alloys of metals. Moreover, the term "electrically insulating" is meant to denote materials with an electrical resistivity above 10 Ω·m at 20° C., e.g. in the range from $10^9$ to $10^{25}$ Ω·m at 20° C.

As used herein, the term "electrical heating unit comprises a macroscopic catalyst" is not meant to be limited to a reforming reactor with a single macroscopic structure. Instead, the term is meant to cover both a macroscopic structure with ceramic coating and catalytically active material as well as an array of such macroscopic structures with ceramic coating and catalytically active material.

The term "macroscopic structure supporting a ceramic coating" is meant to denote that the macroscopic structure is coated by the ceramic coating at, at least, a part of the surface of the macroscopic structure. Thus, the term does not imply that all the surface of the macroscopic structure is coated by the ceramic coating; in particular, at least the parts of the macroscopic structure which are electrically connected to the conductors and thus to the electrical power supply do not have a coating thereon. The coating is a ceramic material with pores in the structure which allows for supporting catalytically active material on and inside the coating and has the same function as a catalytic support. Advantageously, the catalytically active material comprises catalytically active particles having a size in the range from about 5 nm to about 250 nm.

As used herein, the term "macroscopic structure" is meant to denote a structure which is large enough to be visible with the naked eye, without magnifying devices. The dimensions of the macroscopic structure are typically in the range of centimeters or even meters. Dimensions of the macroscopic structure are advantageously made to correspond at least partly to the inner dimensions of the pressure shell, saving room for the heat insulation layer and conductors.

A ceramic coating, with or without catalytically active material, may be added directly to a metal surface by wash coating. The wash coating of a metal surface is a well-known process; a description is given in e.g. Cybulski, A., and Moulijn, J. A., Structured catalysts and reactors, Marcel Dekker, Inc, New York, 1998, Chapter 3, and references herein. The ceramic coating may be added to the surface of the macroscopic structure and subsequently the catalytically active material may be added; alternatively, the ceramic coat comprising the catalytically active material is added to the macroscopic structure.

Preferably, the macroscopic structure has been manufactured by extrusion of a mixture of powdered metallic particles and a binder to an extruded structure and subsequent sintering of the extruded structure, thereby providing a material with a high geometric surface area per volume. A ceramic coating, which may contain the catalytically active material, is provided onto the macroscopic structure before a second sintering in an oxidizing atmosphere, in order to form chemical bonds between the ceramic coating and the macroscopic structure. Alternatively, the catalytically active material may be impregnated onto the ceramic coating after the second sintering. When chemical bonds are formed between the ceramic coating and the macroscopic structure, an especially high heat conductivity between the electrically heated macroscopic structure and the catalytically active material supported by the ceramic coating is possible, offering close and nearly direct contact between the heat source and the catalytically active material of the macroscopic structure. Due to close proximity between the heat source and the catalytically active material, the heat transfer is effective, so that the macroscopic structure can be very efficiently heated. A compact reforming reactor in terms of gas processing per reforming reactor volume is thus possible, and therefore the reforming reactor housing the macroscopic structure may be compact. The reforming reactor of the invention does not need a furnace and this reduces the size of the electrically heated reforming reactor considerably.

Preferably, the macroscopic structure comprises Fe, Ni, Cu, Co, Cr, Al, Si or an alloy thereof. Such an alloy may comprise further elements, such as Mn, Y, Zr, C, Co, Mo or combinations thereof. Preferably, the catalytically active material is particles having a size from 5 nm to 250 nm. The catalytically active material may e.g. comprise nickel, ruthenium, rhodium, iridium, platinum, cobalt, or a combination thereof. Thus, one possible catalytically active material is a combination of nickel and rhodium and another combination of nickel and iridium. The ceramic coating may for example be an oxide comprising Al, Zr, Mg, Ce and/or Ca. Exemplary coatings are calcium aluminate or a magnesium aluminum spinel. Such a ceramic coating may comprise further elements, such as La, Y, Ti, K, or combinations thereof. Preferably, the conductors are made of different materials than the macroscopic structure. The conductors may for example be of iron, nickel, aluminum, copper, silver, or an alloy thereof. The ceramic coating is an electrically insulating material and will typically have a thickness in the range of around 100 µm, say 10-500 µm. In addition, a sixth catalyst may be placed within the pressure shell and in channels within the macroscopic structure, around the macroscopic structure or upstream and/or downstream the macroscopic structure to support the catalytic function of the macroscopic structure.

In an embodiment, the first, second, third, fourth, fifth, and/or sixth catalysts are catalysts suitable for the steam reforming reaction, the prereforming reaction, methanation and/or the water gas shift reaction. Examples of relevant such catalysts are $Ni/MgAl_2O_4$, $Ni/CaAl_2O_4$, $Ni/Al_2O_3$, $Fe_2O_3/Cr_2O_3/MgO$, and $Cu/Zn/Al_2O_3$. In an embodiment, the first, second, third, fourth fifth, and/or sixth catalysts is a steam reforming catalyst. Examples of steam reforming catalysts are $Ni/MgAl_2O_4$, $Ni/Al_2O_3$, $Ni/CaAl_2O_4$, $Ru/MgAl_2O_4$, $Rh/MgAl_2O_4$, $Ir/MgAl_2O_4$, $Mo_2C$, $Wo_2C$, $CeO_2$, a noble metal on an $Al_2O_3$ carrier, but other catalysts suitable for reforming are also conceivable.

Another aspect of the invention relates to a process for producing synthesis gas in a synthesis gas plant comprising a reforming section. The reforming section comprises an electrically heated reforming reactor housing a first catalyst, a fired reforming reactor in parallel with the electrically heated reforming reactor. The fired reforming reactor comprises one or more tubes housing a second catalyst. The fired reforming reactor further comprises one or more burners arranged for providing heat for steam methane reforming reaction within the one or more tubes. The process comprises the steps of:

inletting a first part of a feed gas comprising hydrocarbons to the electrically heated reforming reactor and carrying out steam methane reforming to provide a first synthesis gas stream, inletting a second part of the feed gas comprising hydrocarbons to the fired reforming reactor, and carrying out steam methane reforming to provide a second synthesis gas stream, providing a fuel gas to the one or more burners to provide heat for steam methane reforming reaction within the one or more tubes of the fired reforming reactor, outputting a combined synthesis gas stream comprising the first and/or second synthesis gas streams or part thereof from the reforming section, optionally, in a post processing unit downstream the electrically heated reforming reactor and the fired reforming reactor, post processing the combined synthesis gas stream to provide a post processed synthesis gas stream, separating the combined synthesis gas stream or the post processed synthesis gas stream into a condensate, a product synthesis gas and an off-gas in a gas separation unit downstream the water gas shift unit, and recycling at least part of the off-gas from the gas separation unit as fuel gas to the one or more burners.

Advantages of the process and embodiments thereof correspond to the advantages of the synthesis gas plant and embodiments thereof and will therefore not be described in further detail here.

However, it should be noted that the first, second and optional third part of the feed gas comprising hydrocarbons may be a first, second and optional third part of a single feed gas stream comprising hydrocarbons, where the single feed gas stream is split up into streams fed into the first, second and optional third reforming reactors, possibly together with steam. In this case, the composition of the first, second and optional third part of the feed gas is substantial identical. However, additional gasses, such as an oxidant gas and/or steam, may be added to the first, second and optional third part of the feed gas before they are fed into the respective reforming reactors.

In an embodiment, the first part of the feed gas is about 5-20 vol % of the feed gas. In the case, where the reforming section comprises an electrically heated reforming reactor and a fired reforming reactor, and no further reforming reactors, the first part of the feed gas to the electrically heated reforming reactor is advantageously about 10-20 vol %, e.g. about 15 vol %, of the feed gas and the second part of the feed gas to the fired reforming reactor is thus about 80-90 vol %, e.g. about 85 vol %, of the feed gas. These relative amounts of the first and second parts of the feed gas are advantageous in the case where the synthesis gas plant is a hydrogen plant and the gas separation unit is a PSA unit. In an alternative embodiment, e.g. in a synthesis gas plant with a cold box, the first part is between 40 and 60 vol % of the feed gas and the second part is between 60 and 40 vol % of the feed gas. It should be noted, that further gasses, such as steam, may be added to the first and/or second part of the feed gas after the split into first and second part of the feed gas. The percentages of the feed gas which become the first and second parts thereof, are meant to denote the percentages thereof at the split of the feed gas into first and second parts.

In an embodiment, where the reforming section comprises a gas heated steam methane reforming reactor, the first part of the feed gas is about 5-10 vol % of the feed gas, the second part of the feed gas is about 80-90 vol % of the feed gas, and the third part of the feed gas is about 5-10 vol % of the feed gas. The ratio of the first part of the feed gas to the second part of the feed gas can advantageously be chosen in such a way that the resulting off-gas generated in the downstream gas separation system does not exceed the fuel requirements of the fired reforming reactor.

In a particular embodiment of the process of the invention, the process is controlled by means of adjusting the ratio of the first part of the feed gas to the second part of the feed gas so as to produce a selected outlet temperature in the second synthesis gas stream and a selected amount of off-gas from the gas separation unit. Preferably, the process is further controlled by adjusting the heating of the electrically heated reforming reactor to produce a constant output of the first synthesis gas stream.

Moreover, it should be noted that the order in which the steps of the process are written are not necessarily the order in which the process steps take place, in that two or more steps may take place simultaneously, or the order may be different that indicated above.

DETAILED DESCRIPTION OF THE FIGURES

Figure 1:
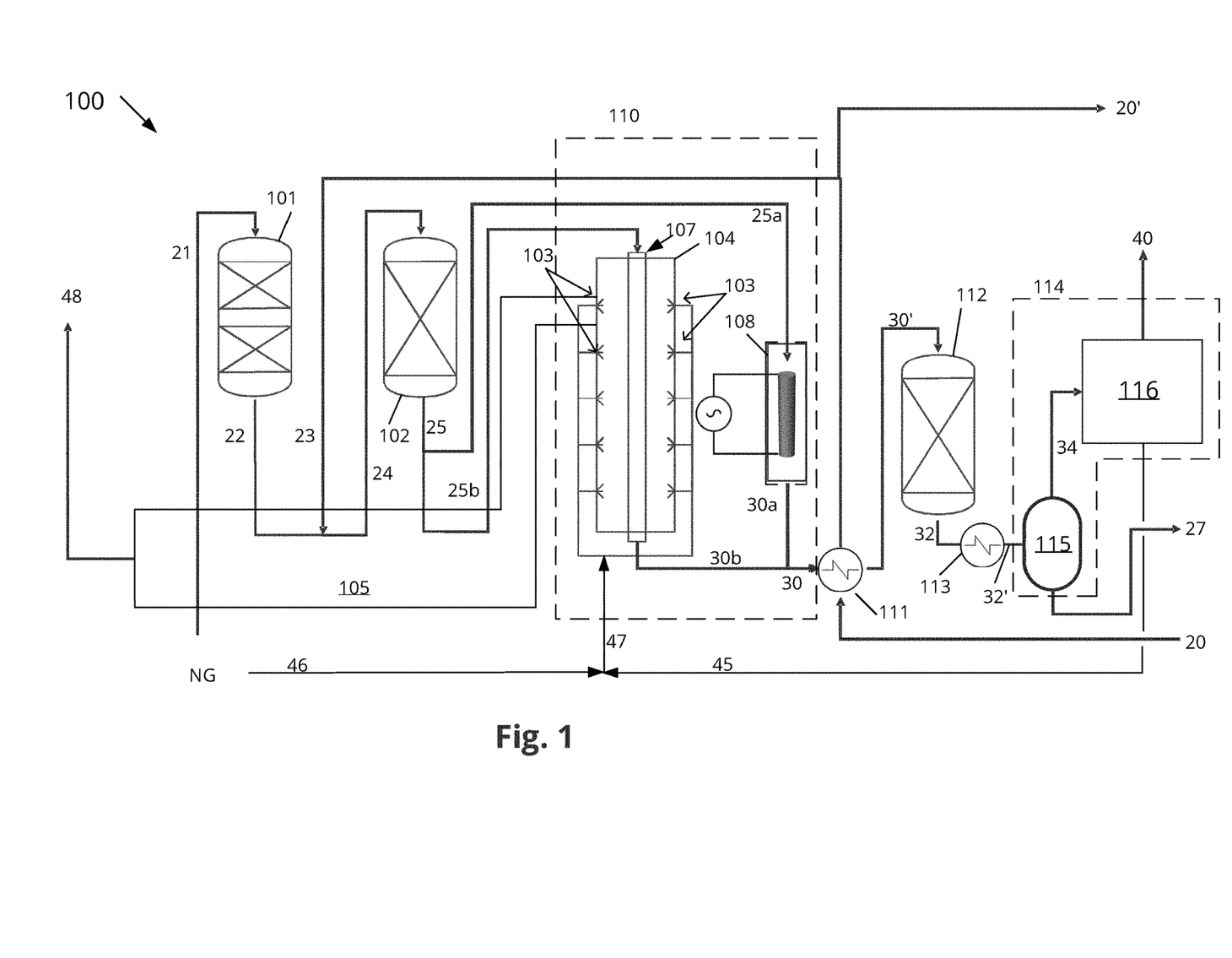
FIG. 1 shows a hydrogen plant according to an embodiment of the invention, where the reforming section comprises a steam methane reforming reactor and an electrically heated reforming reactor.
Figure 2:
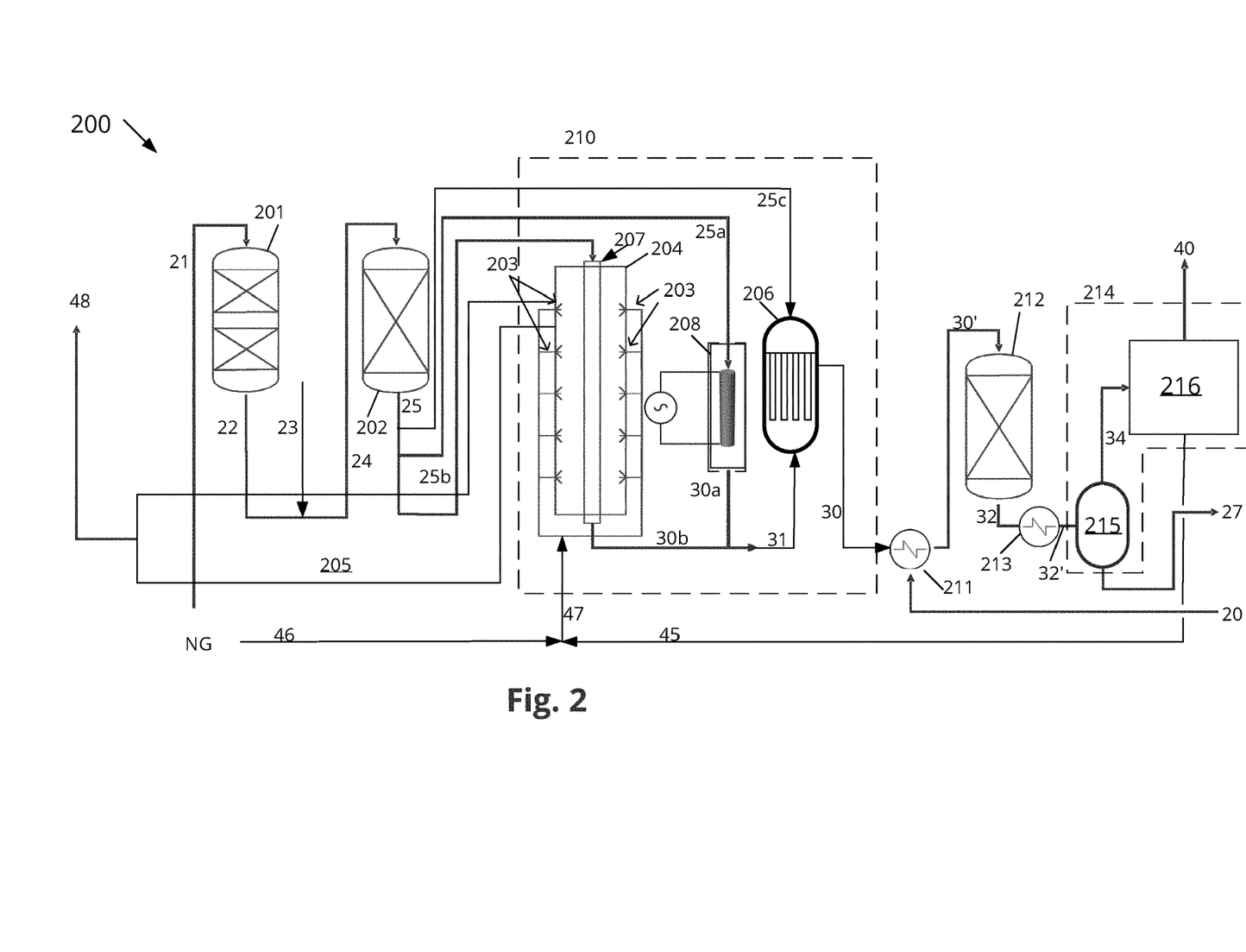
FIG. 2 shows a hydrogen gas plant according to an embodiment of the invention, where the reforming section comprises a steam methane reforming reactor, an electrically heated reforming reactor, and a gas heated steam methane reforming reactor.

FIG. 1 shows a synthesis gas plant 100 according to an embodiment of the invention. The synthesis gas plant 100 is a hydrogen plant comprising a reforming section 110 with an electrically heated reforming reactor 108 housing a first catalyst and a fired steam reforming reactor 104 housing a second catalyst. The fired reforming reactor is a side fired tubular steam methane reforming reactor 104. Thus, the side fired tubular steam methane reforming reactor 104 comprises a number of tubes 107 housing the second catalyst and a number of burners 103 arranged to heat the tubes 107. For the sake of clarity, only one tube 107 is shown in FIG. 2. Fuel is fed to the burners 103 and is burned to provide the heat for the tubes 107. Hot flue gas from the burners 103 is directed to a preheating section 105 of the steam methane reforming reactor 104 and is used for preheating feed gas and steam. The electrically heated reforming reactor 108 and side fired steam reforming reactor 104 are arranged in parallel. The electrically heated reforming reactor 108 and side fired steam reforming reactor 104 are arranged to receiving a first and second part 25a, 25b of the feed gas 25, and to generate a first and second synthesis gas 30a, 30b, respectively.

During operation of the hydrogen plant 100, a feed gas 21 comprising hydrocarbons undergoes feed purification in a desulfurization unit 101 and becomes a desulfurized gas 22. The feed gas 21 comprising hydrocarbons is e.g. natural gas or town gas. The desulfurized gas 22 is preheated in the preheating section 105 of the steam methane reformer 104 and steam 23 is added, resulting in a gas stream 24. The gas stream 24 is led to a prereforming unit 102 housing steam reforming catalyst. Typically, the prereforming unit 102 is an adiabatic prereforming unit, wherein higher hydrocarbons are reacted so that the prereformed gas 25 exiting the prereformer contains no or very small amounts of higher hydrocarbons. The prereformed gas 25 is divided into a first part 25a of the feed gas which is led to the electrically heated reforming reactor 108 and a second part 25b of the feed gas which is led to the steam methane reformer 104. The first catalyst in the electrically heated reforming reactor 108 and the second catalyst in the steam methane reformer 104 are steam methane reforming catalysts arranged to catalyze the steam methane reforming reaction in the electrically heated reforming reactor 108 and the steam methane reformer 104. The first and second part 25a, 25b of the feed gas 25 thus undergo steam methane reforming in the electrically heated reforming reactor 108 and the steam methane reformer 104, respectively, and a first and second synthesis gas stream 30a, 30b exit the electrically heated reforming reactor 108 and the steam methane reformer 104, respectively, and are combined to a combined synthesis gas stream 30 exiting the reforming section 110. The combined synthesis gas stream 30 is cooled in a heat exchanger 111 to a cooled combined synthesis gas stream 30'. The cooled combined synthesis gas stream 30' enters a post processing unit 112, viz. a water gas shift unit, and a water gas shifted synthesis gas 32 exits the water gas shift unit 112. The water gas shifted synthesis gas 32 is cooled in a second heat exchanger 113 to a cooled water gas shifted synthesis gas 32', which enters the gas separation unit 114. The gas separation unit 114 comprises a flash separation unit 115 and a downstream PSA unit 116. The cooled water gas shifted synthesis gas 32' thus enters the flash separation unit 115 arranged to separate the cooled water gas shifted synthesis gas 32' into water 27 and a dry synthesis gas 34. The dry synthesis gas 34 enters the PSA unit 116 arranged to separate the dry synthesis gas 34 into a product synthesis gas 40 in the form of a stream of substantially pure hydrogen and an off-gas 45. The off-gas 45 is recycled as fuel to the burners 103 of the steam methane reformer 104. The off-gas 45 is combined with a small amount of natural gas 46 to form the fuel gas 47 sent to the burners 103 of the steam methane reformer 104. The fuel gas 47 is burnt off in the burners 103, thus heating the tubes 107 with the second catalyst. In the preheating section 105, the flue gas from the burners 103 provides heat for preheating the feed gasses and exits as flue gas 48 from the preheating section 105. A heat exchange fluid 20, such as water, is used for heat exchange in the heat exchanger 111 and a heated heat exchange fluid, such as steam, is exported as stream 20'.

It should be noted, that the synthesis gas plant 100 typically comprises further equipment, such as compressors, heat exchangers etc.; however, such further equipment is not shown in FIG. 1.

FIG. 2 shows a synthesis gas plant 200 according to an embodiment of the invention, where the reforming section 210 comprises a steam methane reforming reactor, an electrically heated reforming reactor and a gas heated steam methane reforming reactor. The synthesis gas plant 200 is a hydrogen plant comprising a reforming section 210 with an electrically heated reforming reactor 208 housing a first catalyst, a fired steam reforming reactor 204 housing a second catalyst and a gas heated steam methane reforming reactor 206 housing a fourth catalyst. The fired reforming reactor 204 is a side fired tubular steam methane reforming reactor 204. Thus, the side fired tubular steam methane reforming reactor 204 comprises a number of tubes 207 housing the second catalyst and a number of burners 203 arranged to heat the tubes 207. For the sake of clarity, only one tube 207 is shown in FIG. 2. Fuel is fed to the burners 203 and is burned to provide the heat for the tubes 207. Hot flue gas from the burners 203 is directed to a preheating section 205 of the steam methane reforming reactor 204 and is used for preheating feed gas and steam. The electrically heated reforming reactor 208 and side fired steam reforming reactor 204 are arranged in parallel. The electrically heated reforming reactor 208 and side fired steam reforming reactor 204 are arranged to receive a first and second part 25a, 25b, respectively, of the feed gas 25 and to generate a first and second synthesis gas 30a, 30b, respectively.

During operation of the hydrogen plant 200, a feed gas 21 comprising hydrocarbons undergoes feed purification in a desulfurization unit 201 and becomes a desulfurized gas 22. The feed gas 21 comprising hydrocarbons is e.g. natural gas or town gas. The desulfurized gas 22 is preheated in the preheating section 205 of the steam methane reformer 204 and steam 23 is added, resulting in a gas stream 24. The gas stream 24 is led to a prereforming unit 202 housing steam reforming catalyst. Typically, the prereforming unit 202 is an adiabatic prereforming unit, wherein higher hydrocarbons are reacted so that the prereformed gas 25 exiting the prereformer contains no or very small amounts of higher hydrocarbons. The prereformed gas 25 is divided into a first part 25a of the gas which is led to the electrically heated reforming reactor 208, a second part 25b of the feed gas which is led to the steam methane reformer 204 and a third part 25c of the feed gas which is led to the gas heated steam methane reforming reactor 206. The first catalyst in the electrically heated reforming reactor 208, the second catalyst in the steam methane reformer 204 and the fourth catalyst in the gas heated steam methane reforming reactor 206 are steam methane reforming catalysts arranged to catalyze the steam methane reforming reaction in the electrically heated reforming reactor 208, the steam methane reformer 204 and the gas heated steam methane reforming reactor 206. The first, second and third feed gasses 25a, 25b, 25c, respectively, thus undergo steam methane reforming in the electrically heated reforming reactor 208, the steam methane reformer 204 and the gas steam methane reforming reactor 206, respectively. The electrically heated reforming reactor 208 generates a first synthesis gas 30a and the steam methane reformer 204 generates a second synthesis gas 30b. The first and second synthesis gas 30a, 30b are combined to a synthesis gas stream 30 which is inlet to the gas heated steam methane reforming reactor 206 in order to provide heat for the steam methane reforming reaction of the third feed gas 25c entering the gas heated steam methane reforming reactor from another side.

A third synthesis gas steam 30 is outlet from the gas heated steam methane reforming reactor 206 as a combined gas synthesis stream 30 and thereby from the reforming section 210. The combined synthesis gas stream 30 is cooled in a heat exchanger 211 to a cooled combined synthesis gas stream 30'. The cooled combined synthesis gas stream 30' enters a post processing unit 212, viz. a water gas shift unit, and a water gas shifted synthesis gas 32 exits the water gas shift unit 212. The water gas shifted synthesis gas 32 is cooled in a second heat exchanger 213 to a cooled water gas shifted synthesis gas 32', which enters the gas separation unit 214. The gas separation unit 214 comprises a flash separation unit 215 and a downstream PSA unit 216. The cooled water gas shifted synthesis gas 32' thus enters the flash separation unit 215 arranged to separate the cooled water gas shifted synthesis gas 32' into water 27 and a dry synthesis gas 34. The dry synthesis gas 34 enters the PSA unit 216 arranged to separate the dry synthesis gas 34 into a product synthesis gas 40 in the form of a stream of substantially pure hydrogen and an off-gas 45. The off-gas 45 is recycled as fuel to the burners 203 of the steam methane reformer 204. The off-gas 45 is combined with a small amount of natural gas 46 to form the fuel gas 47 sent to the burners 203 of the steam methane reformer 204. The fuel gas 47 is burnt off in the burners 203, thus heating the tubes 207 with second catalyst. In the preheating section 205, the flue gas from the burners 203 provides heat for preheating the feed gasses and exits as flue gas 48 from the preheating section 205. A heat exchange fluid 20, such as water, is used for heat exchange in the heat exchanger 211 and a heated heat exchange fluid, such as steam, is exported as stream 20'.

It should be noted, that the synthesis gas plant 200 typically comprises further equipment, such as compressors, heat exchangers etc.; however, such further equipment is not shown in FIG. 2.

Figure 3:
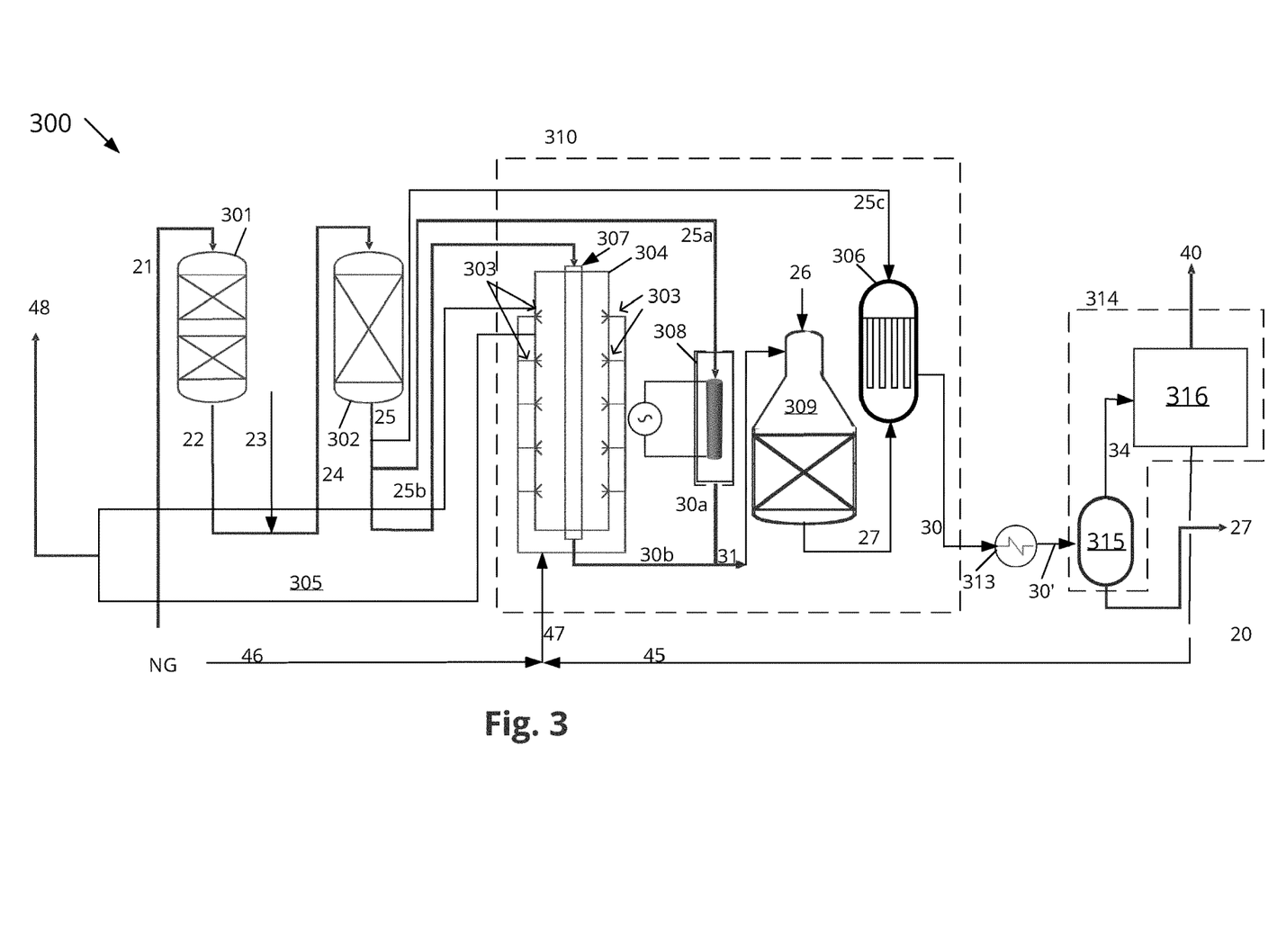
FIG. 3 shows a synthesis gas plant according to an embodiment of the invention, where the reforming section comprises four reforming reactors.

FIG. 3 shows a synthesis gas plant 300 according to an embodiment of the invention, where the reforming section comprises four reforming reactors, namely an electrically heated reforming reactor 308 housing a first catalyst in parallel with a fired steam reforming reactor 304 housing a second catalyst. A autothermal reactor 309, housing a third catalyst, is located downstream the electrically heated reforming reactor 308 and the fired steam reforming reactor 304, and the reforming section 310 also comprises a gas heated reactor 306 housing a fourth catalyst.

The fired reforming reactor 304 is a side fired tubular steam methane reforming reactor 304. Thus, the side fired tubular steam methane reforming reactor 304 comprises a number of tubes 307 housing the second catalyst and a number of burners 303 arranged to heat the tubes 307. For the sake of clarity, only one tube is shown in FIG. 3. Fuel is fed to the burners 303 and is burned to provide the heat for the tubes 307. Hot flue gas from the burners 303 is directed to a preheating section 305 of the steam methane reforming reactor 304 and is used for preheating feed gas and steam. The electrically heated reforming reactor 308 and side fired steam reforming reactor 304 are arranged in parallel. The electrically heated reforming reactor 308 and side fired steam reforming reactor 304 are arranged to receive a first and second part 25a, 25b, respectively, of the feed gas 25, and to generate a first and second synthesis gas 30a, 30b, respectively.

During operation of the synthesis gas plant 300, a feed gas 21 comprising hydrocarbons undergoes feed purification in a desulfurization unit 301 and becomes a desulfurized gas 22. The feed gas 21 comprising hydrocarbons is e.g. natural gas or town gas. The desulfurized gas 22 is preheated in the preheating section 305 of the steam methane reforming reactor 304 and steam 23 is added, resulting in a gas stream 24. The gas stream 24 is led to a prereforming unit 302 housing steam reforming catalyst. Typically, the prereforming unit 302 is an adiabatic prereforming unit, wherein higher hydrocarbons are reacted so that the prereformed gas 25 exiting the prereformer contains no or very small amounts of higher hydrocarbons. The prereformed gas 25 is divided into a first part 25a of the feed gas which is led to the electrically heated reforming reactor 308, a second part 25b of the feed gas which is led to the steam methane reforming reactor 304 and a third part 25c of the feed gas which is led to the gas heated steam methane reforming reactor 306.

The first catalyst in the electrically heated reforming reactor 308, the second catalyst in the steam methane reforming reactor 304, the third catalyst in the autothermal reformer 309 and the fourth catalyst in the gas heated steam methane reforming reactor 306 are steam methane reforming catalysts arranged to catalyze the steam methane reforming reaction in the electrically heated reforming reactor 308, the steam methane reforming reactor 304, the autothermal reformer 309 and the gas heated steam methane reforming reactor 306.

The first, second and third parts 25a, 25b, 25c, respectively, of the feed gas thus undergo steam methane reforming in the electrically heated reforming reactor 308, the steam methane reforming reactor 304 and the gas heated steam methane reforming reactor 306, respectively. The electrically heated reforming reactor 308 generates a first synthesis gas 30a and the steam methane reforming reactor 304 generates a second synthesis gas 30b. The first and second synthesis gas 30a, 30b are combined to a synthesis gas stream 31 which is inlet to the autothermal reforming reactor 309. A stream of oxidant gas 26, such as oxygen or air, is also let into the autothermal reforming reactor 309. A stream of auto-reformed gas 27 exits the autothermal reformer 309 and is inlet to the gas heated steam methane reforming reactor 306 in order to provide heat for the steam methane reforming reaction of the third part 25c of the feed gas 25 entering the gas heated steam methane reforming reactor 306 from another side.

A synthesis gas steam 30 is outlet from the gas heated steam methane reforming reactor 306 and thereby from the reforming section 310 as a combined gas synthesis stream 30. The combined synthesis gas stream 30 is cooled in a heat exchanger 313 to a cooled combined synthesis gas stream 30'.

The cooled combined synthesis gas stream 30' enters a gas separation unit 314. The gas separation unit 314 comprises a flash separation unit 315 and a downstream PSA unit 316. The cooled water gas shifted synthesis gas 32' thus enters the flash separation unit 315 arranged to separate the cooled water gas shifted synthesis gas 32' into water 27 and a dry synthesis gas 34. The dry synthesis gas 34 enters the PSA unit 316 arranged to separate the dry synthesis gas 34 into a product synthesis gas 40 in the form of a stream of hydrogen and carbon monoxide, and an off-gas 45. The off-gas 45 is recycled as fuel to the burners 303 of the steam methane reforming reactor 304. The off-gas 45 is combined with a small amount of natural gas 46 to form the fuel gas 47 sent to the burners 303 of the steam methane reforming reactor 304. The fuel gas 47 is burnt off in the burners 303, thus heating the tubes 307 with second catalyst. In the preheating section 305, the flue gas from the burners 303 provides heat for preheating the feed gasses and exits as flue gas 48 from the preheating section 305. A heat exchange fluid 20, such as water, is used for heat exchange in the heat exchanger 311 and a heated heat exchange fluid, such as steam, is exported as stream 20'.

It should be noted, that the synthesis gas plant 300 typically comprises further equipment, such as compressors, heat exchangers etc.; however, such further equipment is not shown in FIG. 3.

Figure 4:
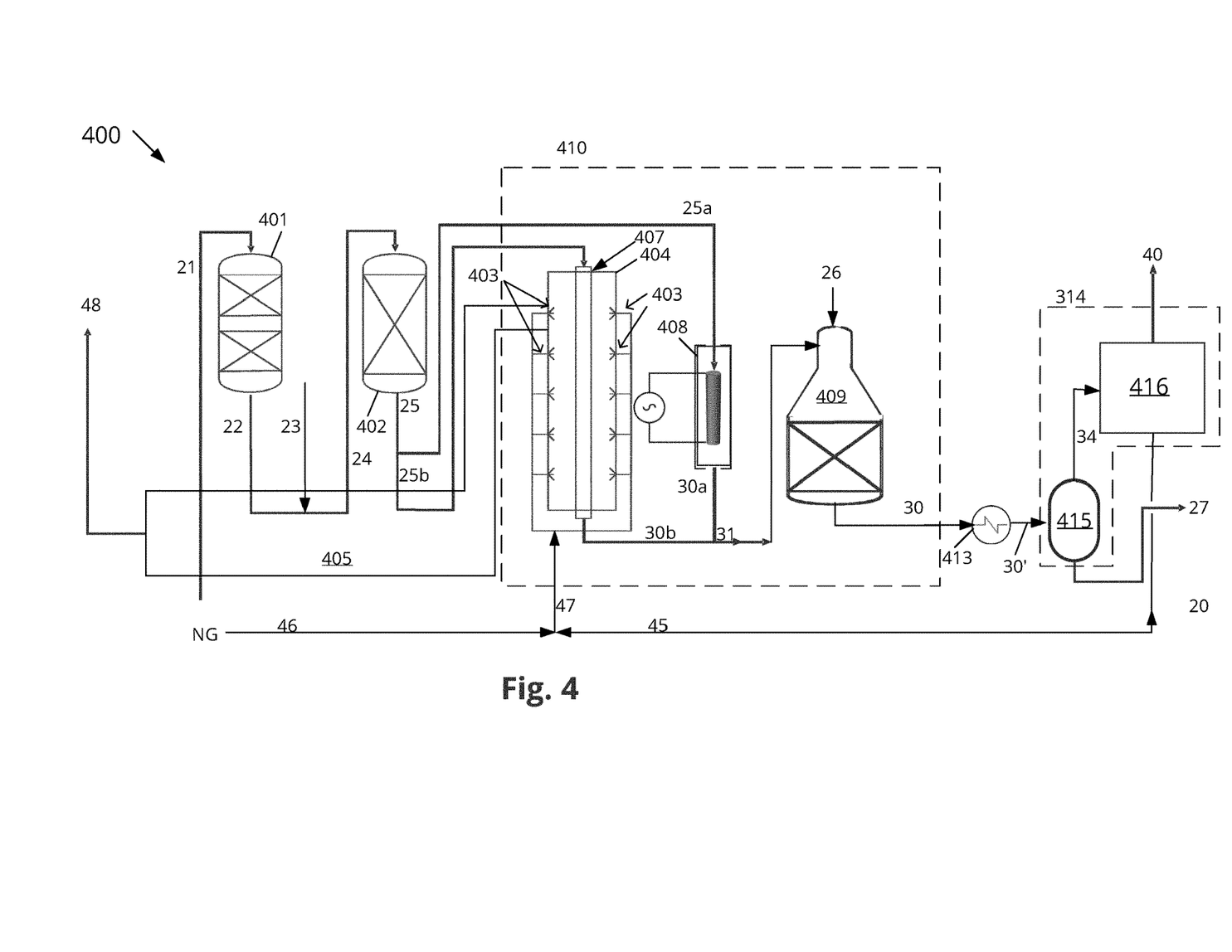
FIG. 4 shows a synthesis gas plant according to an embodiment of the invention where the reforming section comprises a steam methane reforming reactor, an electrically heated reforming reactor and an autothermal reforming reactor.

FIG. 4 shows a synthesis gas plant according to an embodiment of the invention where the reforming section comprises a steam methane reforming reactor, an electrically heated reforming reactor and an autothermal reforming reactor.

FIG. 4 shows a synthesis gas plant 400 according to an embodiment of the invention, where the reforming section comprises four reforming reactors, namely an electrically heated reforming reactor 408 housing a first catalyst in series with a fired steam reforming reactor 404 housing a second catalyst. An autothermal reactor 409, housing a third catalyst, is located downstream the electrically heated reforming reactor 408 and the fired steam reforming reactor 404.

The fired reforming reactor 404 is a side fired tubular steam methane reforming reactor 404. Thus, the side fired tubular steam methane reforming reactor 404 comprises a number of tubes 407 housing the second catalyst and a number of burners 403 arranged to heat the tubes 407. For the sake of clarity, only one tube 407 is shown in FIG. 4. Fuel is fed to the burners 403 and is burned to provide the heat for the tubes 407. Hot flue gas from the burners 403 is directed to a preheating section 405 of the steam methane reforming reactor 404 and is used for preheating feed gas and steam. The electrically heated reforming reactor 408 and side fired steam reforming reactor 404 are arranged in parallel. The electrically heated reforming reactor 408 and side fired steam reforming reactor 404 are arranged to receiving a first and second part 25a, 25b, respectively, of the feed gas 25 and to generate a first and second synthesis gas 30a, 30b, respectively.

During operation of the synthesis gas plant 400, a feed gas 21 comprising hydrocarbons undergoes feed purification in a desulfurization unit 401 and becomes a desulfurized gas 22. The feed gas 21 comprising hydrocarbons is e.g. natural gas or town gas. The desulfurized gas 22 is preheated in the preheating section 405 of the steam methane reforming reactor 404 and steam 23 is added, resulting in a gas stream 24. The gas stream 24 is led to a prereforming unit 402 housing steam reforming catalyst. Typically, the prereforming unit 402 is an adiabatic prereforming unit, wherein higher hydrocarbons are reacted so that the prereformed gas 25 exiting the prereformer contains no or very small amounts of higher hydrocarbons. The prereformed gas 25 is divided into a first part 25a of the feed gas 25 which is led to the electrically heated reforming reactor 408, and a second part 25b of the feed gas 25 which is led to the steam methane reforming reactor 404.

The first catalyst in the electrically heated reforming reactor 408, the second catalyst in the steam methane reforming reactor 404, and the third catalyst in the autothermal reformer 409 are steam methane reforming catalysts arranged to catalyze the steam methane reforming reaction in the electrically heated reforming reactor 408, the steam methane reforming reactor 404, and the autothermal reformer 409.

The first and second part 25a, 25c, respectively, of the feed gas 25 thus undergo steam methane reforming in the electrically heated reforming reactor 408, and the steam methane reforming reactor 404, respectively. The electrically heated reforming reactor 408 generates a first synthesis gas 30a and the steam methane reforming reactor 404 generates a second synthesis gas 30b. The first and second synthesis gas 30a, 30b are combined to a synthesis gas stream 31 which is inlet to the autothermal reforming reactor 409. A stream of oxidant gas 26, such as oxygen or air, is also let into the autothermal reforming reactor 409. A stream of auto-reformed gas 30 exits the autothermal reformer 409. The stream of auto-reformed gas 30 is the combined synthesis gas stream 30 exiting the reforming section 410. The combined synthesis gas stream 30 is cooled in a heat exchanger 413 to a cooled combined synthesis gas stream 30'.

The cooled combined synthesis gas stream 30' enters a gas separation unit 414. The gas separation unit 414 comprises a flash separation unit 415 and a downstream PSA unit 416. The cooled water gas shifted synthesis gas 32' thus enters the flash separation unit 415 arranged to separate the cooled water gas shifted synthesis gas 32' into water 27 and a dry synthesis gas 34. The dry synthesis gas 34 enters the PSA unit 416 arranged to separate the dry synthesis gas 34 into a product synthesis gas 40 in the form of a stream of hydrogen and carbon monoxide, and an off-gas 45. The off-gas 45 is recycled as fuel to the burners 403 of the steam methane reforming reactor 404. The off-gas 45 is combined with a small amount of natural gas 46 to form the fuel gas 47 sent to the burners 403 of the steam methane reforming reactor 404. The fuel gas 47 is burnt off in the burners 403, thus heating the tubes 407 with second catalyst. In the preheating section 405, the flue gas from the burners 403 provides heat for preheating the feed gasses and exits as flue gas 48 from the preheating section 405. A heat exchange fluid 20, such as water, is used for heat exchange in the heat exchanger 411 and a heated heat exchange fluid, such as steam, is exported as stream 20'.

It should be noted, that the synthesis gas plant 400 typically comprises further equipment, such as compressors, heat exchangers etc.; however, such further equipment is not shown in FIG. 4.

Example 1

An example of a hydrogen plant 100 as shown in FIG. 1 is given in Table 1, which indicates the gas composition at relevant points in the hydrogen plant. The example illustrates how the electrically heated reforming reactor 108, viz. the first reformer, is integrated together with the fired reforming reactor 104. In the given case, 12% of the feed to the reforming section is sent to the electrically heated reforming reactor while the remaining 88% is sent to the fired reforming reactor. After post processing in the water gas shift unit 112 and product purification in the gas separation unit 114, 104193 Nm³/h of hydrogen is produced. The product purification in the PSA 116 of the gas separation unit 114 results in an off-gas 45, which in this case delivers the principal part of the duty for the fired reforming reactor 104.

The advantage of the embodiment of Example 1 over the embodiment of Example 2 is not simply a result of using two reformers in parallel as compared to one reactor. Thus, it two fired steam methane reformers in parallel were to be used, the yield of hydrogen from a given amount of natural gas with be as low or even lower than the hydrogen yield in the embodiment in Example 2, because two parallel fired reformers would require at least the same amount and potentially a higher amount of fuel for heating the reformers as compared to a single fired reformer.

TABLE 1

| SMR + ER | Stream 24 to preformer | Stream 25 a to Electric reformer | Stream 25 b to SMR | Stream 30 from reforming section | Stream 30' to WGS | Stream 32' to flash separation | Stream 34 to PSA | Product synthesis gas 40 | PSA off gas 45 | Import fuel 46 |
|---|---|---|---|---|---|---|---|---|---|---|
| T [° C.] | 550 | 466 | 650 | 915 | 210 | 40 | 40 | 45 | 30 | 34 |
| P [kg/cm²g] | 31.3 | 30 | 29.8 | 26.5 | 26 | 24 | 24 | 26 | 0.3 | 1.5 |
| $C_{2+}$ [Nm³/h] | 359 | 0 | 0 | 0 | 0 | 0 | 0 | 0 | 0 | 8 |
| $CH_4$ [Nm³/h] | 39730 | 4182 | 33839 | 9432 | 9432 | 9432 | 9432 | 0 | 9432 | 928 |
| CO [Nm³/h] | 0 | 7 | 59 | 24964 | 24964 | 6893 | 6893 | 0 | 6893 | 0 |
| $CO_2$ [Nm³/h] | 307 | 307 | 2484 | 6483 | 6483 | 24554 | 24532 | 0 | 24531 | 7 |
| $H_2$ [Nm³/h] | 902 | 1161 | 9394 | 100011 | 100011 | 118083 | 118078 | 104193 | 12988 | 0 |
| $N_2$ [Nm³/h] | 291 | 32 | 258 | 291 | 291 | 291 | 291 | 104 | 186 | 7 |
| $O_2$ [Nm³/h] | 0 | 0 | 0 | 0 | 0 | 0 | 0 | 0 | 0 | 0 |
| $H_2O$ [Nm³/h] | 73028 | 7479 | 60515 | 35714 | 35714 | 17643 | 491 | 0 | 491 | 0 |

Example 2

A comparative example of a more conventional hydrogen plant using only a single reforming reactor in the form of a fired steam methane reformer is shown in Table 2. Comparing the case of the hydrogen plant 100 of FIG. 1 and indicated in Table 1 with the more conventional hydrogen plant indicated in Table 2, it is seen that both plants use the same amount of natural gas as shown by a combined $CH_4$ feed of 40658 Nm³/h in stream "To preformer" and "Import fuel". However, in Table 1 a hydrogen product of 104193 Nm³/h is achieved, compared to 100000 Nm³/h in Table 2. Thus, by the means of the invention it is possible to achieve a higher yield of hydrogen from a given amount of natural gas since less natural gas is used for heating. In the case where the electricity to drive the electrically heated reforming reactor comes from sustainable sources or is produced from excess steam from the hydrogen plant, the current invention allows for a route to hydrogen with less $CO_2$ emissions. This is seen from the carbon in the fuel, which is 0.40 mol $CO_2$ per mol $H_2$ in the example of Table 1, but 0.42 mol $CO_2$ per mol $H_2$ in the example of Table 2.

The invention claimed is:

1. A synthesis gas plant for producing a synthesis gas, said synthesis gas plant comprising:
    a reforming section arranged to receive a feed gas and provide a combined synthesis gas, wherein said reforming section comprises:
        an electrically heated steam methane reforming reactor housing a first catalyst, said electrically heated steam methane reforming reactor being arranged for receiving a first part of said feed gas comprising hydrocarbons and generating a first synthesis gas stream,
        a fired reforming reactor in parallel with said electrically heated steam methane reforming reactor, said fired reforming reactor comprising one or more tubes housing a second catalyst, said fired reforming reactor further comprising one or more burners for providing heat to said one or more tubes, said one or more tubes being arranged for receiving a second

TABLE 2

| SMR | To preformer | To SMR | From reforming section | To WGS | To flash separation | To PSA | Product synthesis gas | PSA off gas | Import fuel |
|---|---|---|---|---|---|---|---|---|---|
| T [° C.] | 550 | 650 | 915 | 210 | 40 | 40 | 45 | 30 | 34 |
| P [kg/cm²g] | 31.3 | 29.8 | 26.5 | 26 | 24 | 24 | 26 | 0.3 | 1.5 |
| C2 + [Nm³/h] | 343 | 0 | 0 | 0 | 0 | 0 | 0 | 0 | 24 |
| CH4 [Nm³/h] | 38030 | 36394 | 8935 | 8935 | 8935 | 8934 | 0 | 8934 | 2628 |
| CO [Nm³/h] | 0 | 63 | 23997 | 23997 | 6674 | 6673 | 0 | 6673 | 0 |
| CO2 [Nm³/h] | 294 | 2672 | 6198 | 6198 | 23521 | 23499 | 0 | 23500 | 19 |
| H2 [Nm³/h] | 863 | 10103 | 96005 | 96005 | 113328 | 113326 | 100000 | 12466 | 0 |
| N2 [Nm³/h] | 278 | 278 | 278 | 278 | 278 | 278 | 100 | 177 | 19 |
| O2 [Nm³/h] | 0 | 0 | 0 | 0 | 0 | 0 | 0 | 0 | 0 |
| H2O [Nm³/h] | 69903 | 65084 | 34099 | 34099 | 16776 | 471 | 0 | 471 | 0 | part of said feed gas comprising hydrocarbons and outputting a second synthesis gas stream, wherein said reforming section is arranged to output a combined synthesis gas stream comprising said first and/or second synthesis gas streams or part thereof, an optional post processing unit downstream the reforming section, where the optional post processing unit is arranged to receive the combined synthesis gas stream and provide a post processed synthesis gas stream, a gas separation unit arranged to separate said combined synthesis gas stream or said post processed synthesis gas stream into at least a condensate, a product synthesis gas and an off-gas, and connections for recycling at least part of the said off-gas from said gas separation unit to said one or more burners, wherein said electrically heated steam methane reforming reactor comprises:

a pressure shell housing an electrical heating unit arranged to heat said first catalyst, where said first catalyst comprises a catalytically active material operable to catalyzing steam reforming of said first part of said feed gas, wherein said pressure shell has a design pressure of between 5 and 45 bar, a heat insulation layer adjacent to at least part of the inside of said pressure shell, and at least two conductors electrically connected to said electrical heating unit and to an electrical power supply placed outside said pressure shell, wherein said electrical power supply is dimensioned to heat at least part of said first catalyst to a temperature of at least 500° C. by passing an electrical current through said electrical heating unit.

2. The synthesis gas plant according to claim 1, wherein said reforming section furthermore comprises an autothermal reforming reactor downstream said electrically heated steam methane reforming reactor and said fired reforming reactor, wherein said autothermal reforming reactor comprises a third catalyst and is arranged to receive said first and/or second synthesis gas or part thereof and to provide an auto-reformed synthesis gas stream, wherein the auto-reformed synthesis gas is output from the reforming section as at least part of the combined gas stream.

3. The synthesis gas plant according claim 1, wherein said reforming section furthermore comprises a gas heated steam methane reforming reactor in parallel to said electrically heated steam methane reforming reactor and said fired reforming reactor, wherein said gas heated steam methane reforming reactor comprises a fourth catalyst and being operable to receive a third part of the feed gas comprising hydrocarbons and to utilize at least part of said first and/or second synthesis gas streams as heating media in heat exchange within said gas heated steam methane reforming reactor, said gas heated steam methane reforming reactor being arranged for generating a third synthesis gas stream and outputting said third synthesis gas stream from said reforming section as at least part of said combined synthesis gas.

4. The synthesis gas plant according claim 2, wherein said reforming section furthermore comprises a gas heated steam methane reforming reactor in parallel to said electrically heated steam methane reforming reactor, said fired reforming reactor and said autothermal reforming reactor, wherein said gas heated steam methane reforming reactor comprises a fourth catalyst and being operable to receive a third part of the feed gas comprising hydrocarbons and to utilize at least part of said auto-reformed synthesis gas stream as heating medium in heat exchange within said gas heated steam methane reforming reactor, said gas heated steam methane reforming reactor being arranged for generating a third synthesis gas stream and outputting said third synthesis gas stream from said reforming section as at least part of said combined synthesis gas.

5. The synthesis gas plant according to claim 1, wherein said post processing unit is a post conversion unit having an inlet for allowing inletting heated $CO_2$ addition to the combined synthesis gas upstream the post conversion unit and housing a fifth catalyst active for catalyzing steam methane reforming, methanation and reverse water gas shift.

6. The synthesis gas plant according to claim 1, wherein said post processing unit is a water gas shift unit arranged to carry out water gas shift reaction.

7. The synthesis gas plant according to claim 1, wherein said fired reforming reactor is a steam methane reforming reactor.

8. The synthesis gas plant according to claim 1, wherein said fired reforming reactor is a convective reforming reactor, wherein flue gas from said one or more burners is used as heat exchange medium within the convective reforming reactor.

9. The synthesis gas plant according to claim 1, wherein said electrical heating unit comprises a macroscopic structure of electrically conductive material, where said macroscopic structure supports a ceramic coating and said ceramic coating supports said catalytically active material.

10. A process for producing synthesis gas in the synthesis gas plant of claim 1, said process comprising the steps of:

inletting a first part of a feed gas comprising hydrocarbons to said electrically heated steam methane reforming reactor and carrying out steam methane reforming to provide a first synthesis gas stream, inletting a second part of the feed gas comprising hydrocarbons to said fired reforming reactor, and carrying out steam methane reforming to provide a second synthesis gas stream, providing a fuel gas to said one or more burners to provide heat for steam methane reforming reaction within said one or more tubes of said fired reforming reactor, outputting a combined synthesis gas stream comprising said first and/or second synthesis gas streams or part thereof from said reforming section, optionally, in a post processing unit downstream said electrically heated reforming reactor and said fired reforming reactor, post processing said combined synthesis gas stream to provide a post processed synthesis gas stream, separating said combined synthesis gas stream or said post processed synthesis gas stream into a condensate, a product synthesis gas and an off-gas in a gas separation unit downstream said post processing unit, and recycling at least part of said off-gas from said gas separation unit as fuel gas to said one or more burners, wherein said process further comprises the steps of:

pressurizing said first part of said feed gas to a pressure of between 5 and 45 bar upstream said electrically heated steam methane reforming reactor, passing an electrical current through said electrical heating unit thereby heating at least part of said first catalyst to a temperature of at least 500° C.

11. The process according to claim 10, wherein said reforming section furthermore comprises an autothermal reforming reactor downstream said electrically heated steam methane reforming reactor and said fired reforming reactor, wherein said process furthermore comprises the steps of:

inletting said first and/or second synthesis gas or part thereof into said autothermal reforming reactor, inletting an oxidant gas into said autothermal reforming reactor, generating an auto-reformed synthesis gas stream over a third catalyst within said autothermal reforming reactor, and outputting said auto-reformed synthesis gas from the reforming section as the combined gas stream.

12. The process according to claim 10, wherein said reforming section furthermore comprises a gas heated steam methane reforming reactor in parallel to said electrically heated steam methane reforming reactor and said fired reforming reactor, wherein said gas heated steam methane reforming reactor comprises a fourth catalyst, said process furthermore comprising the steps of:

inletting a third part of the feed gas comprising hydrocarbons into said gas heated steam methane reforming reactor, utilizing at least part of said first and/or second synthesis gas streams as heating media in heat exchange within said gas heated steam methane reforming reactor, generating a third synthesis gas stream over the fourth catalyst within the gas heated steam methane reforming reactor, and outputting said third synthesis gas stream from said reforming section as at least part of said combined synthesis gas.

13. The process according to claim 11, wherein said reforming section furthermore comprises a gas heated steam methane reforming reactor in parallel to said electrically heated steam methane reforming reactor, said fired reforming reactor and said autothermal reforming reactor, wherein said gas heated steam methane reforming reactor comprises a fourth catalyst, said process furthermore comprising the steps of:

inletting a third part of the feed gas comprising hydrocarbons into said gas heated steam methane reforming reactor, utilizing at least part of said auto-reformed synthesis gas stream as heating medium in heat exchange within said gas heated steam methane reforming reactor, generating a third synthesis gas stream over the fourth catalyst within the gas heated steam methane reforming reactor, and outputting said third synthesis gas stream from said reforming section as at least part of said combined synthesis gas.

14. The process according to claim 10, wherein said post processing unit is a post conversion unit housing a fifth catalyst active for catalyzing steam methane reforming, methanation and reverse water gas shift reactions.

15. The process according to claim 10, wherein said post processing unit is a water gas shift unit arranged to carry out water gas shift reaction.

16. The process according to claim 10, wherein said electrical heating unit comprises a macroscopic structure of electrically conductive material, where said macroscopic structure supports a ceramic coating and said ceramic coating supports said catalytically active material.

17. The process according to claim 10, wherein the first part of the feed gas is about 5-20 vol % of the feed gas.

18. The process according to claim 12, wherein the first part of the feed gas is about 5-10 vol % of the feed gas and the third part of the feed gas is about 5-10 vol % of the feed gas.

* * * * *